(12) United States Patent
Fukue et al.

(10) Patent No.: US 7,391,480 B2
(45) Date of Patent: Jun. 24, 2008

(54) IMAGE PROCESSING APPARATUS AND IMAGE PROCESSING METHOD FOR PERFORMING GAMMA CORRECTION

(75) Inventors: Tetsu Fukue, Takatsuki (JP); Satoshi Shigenaga, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 555 days.

(21) Appl. No.: 11/075,741

(22) Filed: Mar. 10, 2005

(65) Prior Publication Data

US 2005/0200761 A1 Sep. 15, 2005

(30) Foreign Application Priority Data

Mar. 10, 2004 (JP) ............................ P2004-066848

(51) Int. Cl.
*H04N 9/69* (2006.01)
*G09G 5/02* (2006.01)

(52) U.S. Cl. ....................................... 348/675; 345/602

(58) Field of Classification Search ......... 348/674–676, 348/254–256; 345/589, 596, 600–602; 358/2.1, 358/3.01, 3.06; 382/168, 169, 274, 270
See application file for complete search history.

(56) References Cited

U.S. PATENT DOCUMENTS

| 4,862,270 | A | | 8/1989 | Nishio et al. |
| 5,255,093 | A | | 10/1993 | Topper et al. |
| 5,481,317 | A | * | 1/1996 | Hieda .......................... 348/674 |
| 5,712,930 | A | * | 1/1998 | Watanabe .................... 382/270 |
| 6,160,532 | A | * | 12/2000 | Kaburagi et al. .............. 345/87 |
| 6,292,165 | B1 | * | 9/2001 | Lin et al. ..................... 345/690 |
| 6,462,837 | B1 | | 10/2002 | Tone |
| 6,965,389 | B1 | * | 11/2005 | Masuji et al. ................ 345/690 |
| 7,016,534 | B2 | * | 3/2006 | Fukawa et al. .............. 382/168 |
| 2002/0186223 | A1 | | 12/2002 | Sasaki |

FOREIGN PATENT DOCUMENTS

JP        3-139972        6/1991

* cited by examiner

*Primary Examiner*—Victor R Kostak
(74) *Attorney, Agent, or Firm*—McDermott Will & Emery LLP

(57) ABSTRACT

An image processing apparatus carrying out a gamma correction for input data includes polygonal line approximating apparatus for carrying out the gamma correction by a polygonal line approximation, a look-up table partially storing gamma correction data corresponding to the input data, and a correction deciding portion and a selector which select the output of one of the polygonal line approximating apparatus and the look-up table corresponding to the input data.

3 Claims, 6 Drawing Sheets

IMAGE PROCESSING APPARATUS AND IMAGE PROCESSING METHOD FOR PERFORMING GAMMA CORRECTION

This application is based on Japanese Patent Application No. 2004-066848, which is incorporated herein by reference.

BACKGROUND OF THE INVENTION

1. Field of the Invention

The present invention relates to an image processing apparatus and an image processing method which carry out a gamma correction for input data.

2. Description of the Related Art

In general, a display for a television or a car navigation system has such a property that a brightness (luminance) to be displayed does not emit a light in proportion to the intensity of a signal input. When the signal input is represented as x, a luminance y of a light emitting output is expressed in $y=x^\gamma$ and a nonlinear curve is obtained. Such a nonlinear characteristic is referred to as a gamma characteristic. In this case, a γ value varies depending on the type of the display. For example, a CRT has γ=2.2.

As a method of correctly carrying out a display operation by using a display, a correction of $y=x^{1/\gamma}$ is performed for video output signals R, G and B (signal input x). This is referred to as a gamma correction.

FIG. 6 is a chart showing a gamma correction curve in case of γ=2.2. The gamma correction curve is obtained by carrying out a normalization in such a manner that the value of gamma correction data y ranges from 0 to 255 when color data x are 8-bit data (0 to 255), and is calculated by the following equation.

$$y=\{(x/256)^{1/2.2}\} \times 256$$

A related gamma correcting method includes a method of storing curve data for a gamma correction in a look-up table constituted by an RAM or an ROM and converting the same data or a method of carrying out a polygonal line approximation over a curve for the gamma correction (for example, see JP-A-3-139972).

In the related method using a look-up table, however, there are circumstances in which a look-up table having a large capacity is required and the scale of a circuit is increased when the number of the bits of input data is increased, that is, a gradation becomes finer. On the other hand, there are circumstances in which the scale of a circuit can be reduced, while picture quality is influenced if a great error is made between gamma correction data subjected to a polygonal line approximation and an ideal value in the method using the polygonal line approximation.

SUMMARY OF THE INVENTION

In consideration of the related circumstances, it is an object of the invention to provide an image processing apparatus and an image processing method in which a gamma correction suppressing a deterioration in picture quality can be carried out on a small circuit scale.

The invention provides an image processing apparatus comprising approximating means for carrying out the gamma correction by a polygonal line approximation, a first storage which partially stores gamma correction data corresponding to the input data, and a selector selecting an output of one of the approximating means and the first storage corresponding to the input data.

According to the structure, there is provided the selector selecting an output of one of the approximating means and the first storage corresponding to the input data. Consequently, the gamma correction data in a region in which an error is increased in the polygonal line approximation are partially prestored in the first storage. Thus, all of the gamma correction data do not need to be stored in the first storage and a storage having a large capacity is not required. As a result, the scale of a circuit can be reduced. Moreover, the output of the approximating means is selected in the case in which the error of the gamma correction which is made by the polygonal line approximation is small, and the output of the first storage is selected in the case in which the error of the gamma correction which is made by the polygonal line approximation is large. Consequently, it is possible to obtain gamma correction data having a small error. Thus, it is possible to suppress a deterioration in picture quality.

Moreover, the image processing apparatus according to the invention comprises a corrector correcting a polygonal line approximation output of the approximating means. Furthermore, the image processing apparatus according to the invention comprises a second storage which stores an error between the polygonal line approximation output and a gamma correction ideal value, and an adder adding the polygonal line approximation output and the error to be stored in the second storage.

In addition, the invention provides an image processing method comprising a selecting step of selecting one of gamma correction data obtained by a polygonal line approximation according to the input data and gamma correction data corresponding to the input data based on an error between the gamma correction data.

Moreover, the image processing method according to the invention comprises a correcting step of correcting the gamma correction data obtained by the polygonal line approximation. In the image processing method according to the invention, furthermore, the correcting step adds the gamma correction data obtained by the polygonal line approximation to an error between the gamma correction data obtained by the polygonal line approximation and a gamma correction ideal value.

In addition, in the image processing method according to the invention, a sample point to be used in the polygonal line approximation is the power of two. In the image processing method according to the invention, moreover, the gamma correction data corresponding to the input data and data on the sample point to be used in the polygonal line approximation have values obtained by regulating picture quality in addition to the gamma correction. In the image processing method according to the invention, furthermore, the gamma correction data corresponding to the input data and the data on the sample point to be used in the polygonal line approximation have a value Y obtained by an equation of $Y=C \cdot X^{1/\gamma}+Br$ when X represents the input data, Y represents data obtained after the regulation of the picture quality, Br represents a luminance value to be used in a brightness, and C represents an inclination to be used in a contrast.

According to the image processing apparatus and the image processing method in accordance with the invention, there are provided the selector selecting an output of one of the approximating means and the first storage corresponding to the input data. Consequently, the gamma correction data in a region in which an error is increased in the polygonal line approximation are partially prestored in the first storage. Thus, all of the gamma correction data do not need to be stored in the first storage and a storage having a large capacity is not required. As a result, the scale of a circuit can be reduced. Moreover, the output of the approximating means is selected in the case in which the error of the gamma correction which is made by the polygonal line approximation is small, and the output of the first storage is selected in the case in which the error of the gamma correction which is made by the polygonal line approximation is large. Consequently, it is possible to obtain gamma correction data having a small error. Thus, it is possible to suppress a deterioration in picture quality.

DETAILED DESCRIPTION OF THE PREFERRED EMBODIMENTS

First Embodiment

Figure 1:
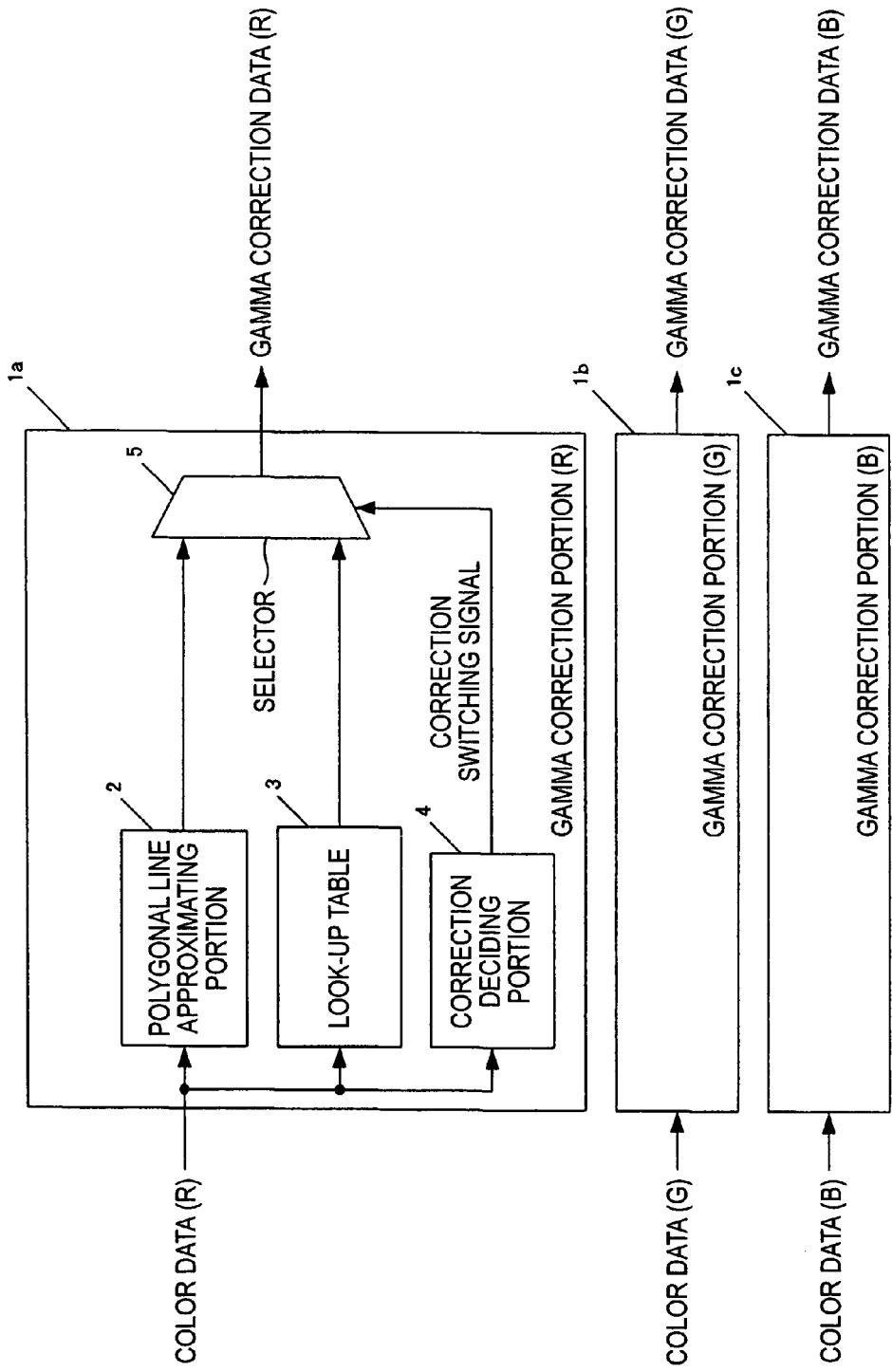
FIG. 1 is a block diagram showing the schematic structure of an image processing apparatus according to a first embodiment of the invention.

FIG. 1 is a block diagram showing the schematic structure of an image processing apparatus according to a first embodiment of the invention. The image processing apparatus shown in FIG. 1 serves to carry out a gamma correction for input data, and a gamma correcting portion (R) 1a serves to carry out the gamma correction for the red component of color data to be displayed and includes a polygonal line approximating portion 2 for carrying out the gamma correction through a polygonal line approximation, a look-up table 3 for partially storing gamma correction data corresponding to input data, and a correction deciding portion 4 and a selector 5 which serve to select the output of one of the approximating means (the approximating portion 2) and the storage (the look-up table 3) corresponding to the input data. A gamma correcting portion (G) 1b and a gamma correcting portion (B) 1c serve to carry out the gamma correction for the green and blue components of the color data to be displayed respectively, and have internal structures which are the same as the internal structure of the gamma correcting portion (R) 1a. Each component of the color data is given as 8-bit digital data, for example.

The structure of the polygonal line approximating portion 2 will be described below in detail. X represents color data and Y represents gamma correction data, and a linear interpolation of points (x0, y0) and (x1, y1) passes through the point (x0, y0) and is expressed as a straight line of (y1−y0)/(x1−x0) in Equation 1.

$$Y = \frac{(y1 - y0)}{(x1 - x0)}(X - x0) + y0 \quad \text{[Equation 1]}$$

When the gamma correction data corresponding to the color data are sampled and expressed in a table, and are applied to the Equation 1, accordingly, the linear interpolation can be carried out. If the same operation is to be implemented by hardware, however, a divider is required for the calculation of the inclination so that the scale of the circuit is increased. For this reason, there is a method of reducing the divider by using a division result table for the calculation of the inclination.

In the embodiment, the color data to be sampled are set to be the power of two which is equal to or greater than "8" ($2^n$ is an integer of 8 or more, that is, n is an integer of 3 or more). Thus, the gamma correction is carried out for the color data without using the divider and the division result table.

In the Equation 1, x0 and x1 of the color data are replaced with the power of two. More specifically, when $x0=2^n$ and $x1=2^{n+1}$ are substituted, Equation 2 is obtained.

$$Y = \frac{(y1 - y0)}{(2^{n+1} - 2^n)}(X - 2^n) + y0, \quad \text{[Equation 2]}$$

where n is an integer of 3 or more.

For simplicity, furthermore, if the Equation 2 is replaced with $2^{n+1}-2^n=2^n$, Equation 3 is obtained.

$$Y = \frac{(y1 - y0)}{2^n}(X - 2^n) + y0, \quad \text{[Equation 3]}$$

where n is an integer of 3 or more.

According to the Equation 3, a data shift processing is enough for the division by $2^n$. For this reason, the divider and the division result table are not required for the linear interpolation of the gamma correction.

Figure 2:
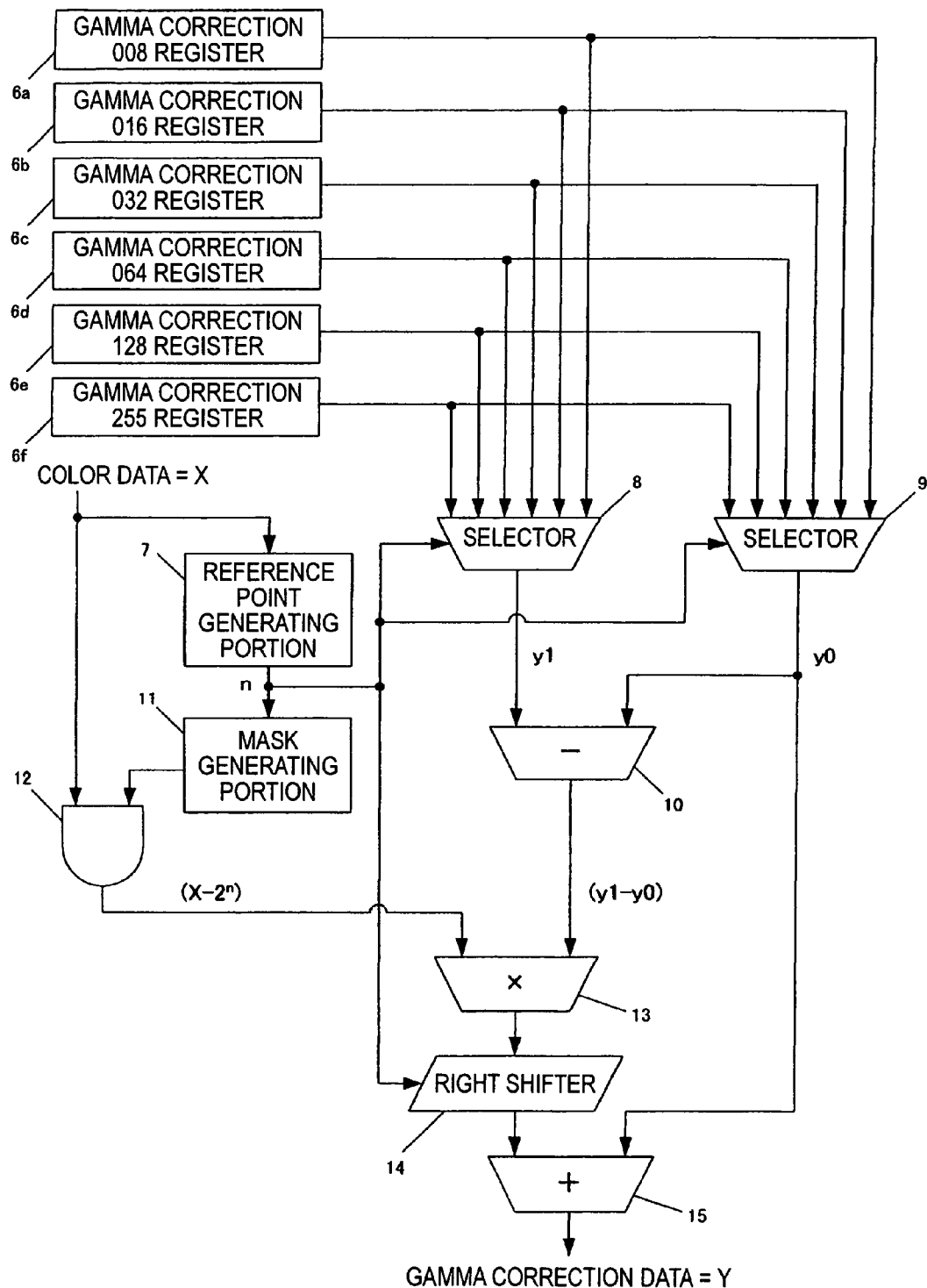
FIG. 2 is a diagram showing the schematic structure of a polygonal line approximating portion in the image processing apparatus according to the first embodiment of the invention.

FIG. 2 is a diagram showing the schematic structure of the polygonal line approximating portion 2 of the image processing apparatus illustrated in FIG. 1. In FIG. 2, a gamma correction 008 register 6a stores gamma correction data corresponding to color data "8", and a gamma correction 016 register 6b stores gamma correction data corresponding to color data "16". Similarly, a gamma correction 032 register 6c stores gamma correction data corresponding to color data "32", and a gamma correction 064 register 6d stores gamma correction data corresponding to color data "64". Furthermore, a gamma correction 128 register 6e stores gamma correction data corresponding to color data "128", and a gamma correction 255 register 6f stores gamma correction data corresponding to color data "255".

The gamma correction 255 register 6f stores gamma correction data corresponding to the color data "255" because "$255=2^8-1$" is a maximum in 8-bit color data. For example, the set contents of the registers 6a to 6f are shown in Table 1, wherein x represents color data, y represents gamma correction data, $y=\{(x/256)^{1/\gamma}\} \times 256$ is set, and γ=2.2 is set.

TABLE 1

| Name of Register | Gamma Correction Data |
|---|---|
| Gamma correction 008 register | 52 |
| Gamma correction 016 register | 72 |
| Gamma correction 032 register | 99 |
| Gamma correction 064 register | 136 |
| Gamma correction 128 register | 186 |
| Gamma correction 255 register | 255 |

Moreover, a reference point generating portion 7 in FIG. 2 serves to generate a reference point x0 of a linear interpolation, that is, a degree "n" in "$2^n$" from the value of color data to be input. More specifically, 1 bit, 2 bits, 3 bits, 4 bits and 5 bits are detected from the most significant bit (MSB) of color data X and "n" is generated corresponding to the data in the reference point generating portion 7 as shown in Table 2. For example, in the case in which the color data X are "00001xxx", "n=3" is generated from "00001000=8=$2^3$".

TABLE 2

| Color Data X | n |
|---|---|
| 1xxxxxxx | 7 |
| 01xxxxxx | 6 |
| 001xxxxx | 5 |
| 0001xxxx | 4 |
| 00001xxx | 3 |
| 00000xxx | x |

Moreover, a selector 8 shown in FIG. 2 selects gamma correction data y1 (a y coordinate on the end point of an interpolating line) from the gamma correction registers 6a to 6f in accordance with the value of "n" supplied from the reference point generating portion 7. Similarly, a selector 9 selects gamma correction data y0 (a y-coordinate on the start of the interpolating line) from the registers 6a to 6f in accordance with the value of "n" supplied from the reference point generating portion 7. Table 3 shows the contents selected by the selectors 8 and 9.

TABLE 3

| N | y0 | y1 |
|---|---|---|
| 3 | Gamma correction 008 register | Gamma correction 016 register |
| 4 | Gamma correction 016 register | Gamma correction 032 register |
| 5 | Gamma correction 032 register | Gamma correction 064 register |
| 6 | Gamma correction 064 register | Gamma correction 128 register |
| 7 | Gamma correction 128 register | Gamma correction 255 register |

A subtractor 10 shown in FIG. 2 receives "y1" from the selector 8 and "y0" from the selector 9, and calculates (y1−y0).

Moreover, a mask generating portion 11 generates data for masking color data X from the value of "n" supplied from the reference point generating portion 7. More specifically, 8-bit data having n bits of "1" are generated from the least significant bit (LSB). For example, mask data of n=3 are "00000111". Table 4 shows the contents of the mask data.

TABLE 4

| n | Mask Data (binary) |
|---|---|
| 3 | 00000111 |
| 4 | 00001111 |
| 5 | 00011111 |
| 6 | 00111111 |
| 7 | 01111111 |

An AND circuit 12 shown in FIG. 2 logically multiplies the color data X and the mask data generated by the mask generating portion 11 to obtain (X−$2^n$). More specifically, the AND circuit 12 extracts "n" from the least significant bit of the color data X. Therefore, an increment Δx of the color data in the interpolating line can be obtained.

A multiplier 13 shown in FIG. 2 carries out a multiplication of (y1−y0) supplied from the subtractor 10 and (X−$2^n$) supplied from the AND circuit 12, that is, (y1−y0)×(X−$2^n$).

Moreover, a right shifter 14 shifts the result of the multiplication of the multiplier 13 rightward corresponding to the value of "n" in accordance with the value of "n" supplied from the reference point generating portion 7 and thus obtains a result of (y1−y0)×(X−$2^n$)/$2^n$. The reason is that the right shift of "n" corresponds to a division based on "$2^n$".

An adder 15 shown in FIG. 2 adds the result of the right shifter 14 to "y0" supplied from the selector 9, thereby obtaining the result of the calculation in the Equation 3, that is, gamma correction data Y.

Thus, the polygonal line approximating portion 2 according to the embodiment is intended for generating the gamma correction data Y when the color data X are "8 to 255". The reason is as follows. While the curvature of the gamma correction data Y is great with the color data X of "0 to 7" and an error is increased in the polygonal line approximation in respect of the characteristics of a gamma correction curve, the curvature of the gamma correction data Y is small and the error in the polygonal line approximation can be reduced with the color data X of "8 to 255". Consequently, it is possible to reduce the scale of the circuit by storing all of the gamma correction data Y in the look-up table.

On the other hand, when the color data "X" are "0 to 7", the gamma correction data Y are obtained by the look-up table 3 which will be described below.

The look-up table 3 shown in FIG. 1 serves to store the gamma correction data Y corresponding to the color data X of "0 to 7", and outputs the gamma correction data Y for the input color data X. For example, in case of color data of x, gamma correction data of y, y={$(x/256)^{1/\gamma}$}×256, and γ=2.2, the gamma correction data Y to be stored in the look-up table 3 are shown in Table 5.

TABLE 5

| Color Data X | Gamma Correction Data Y |
|---|---|
| 0 | 0 |
| 1 | 20 |
| 2 | 28 |
| 3 | 33 |
| 4 | 38 |
| 5 | 42 |
| 6 | 46 |
| 7 | 49 |

The look-up table 3 may be constituted by a memory such as an RAM or an ROM, or a register.

The correction deciding portion 4 shown in FIG. 1 outputs a correction switching signal of "1" if the value of the color data X is equal to or greater than "8", and outputs a correction switching signal of "0" if the value of the color data X is equal to or smaller than "7". Moreover, the selector 5 receives the correction switching signal from the correction deciding portion 4, and selects the gamma correction data output from the polygonal line approximating portion 2 if the correction switching signal is "1" and selects the gamma correction data output from the look-up table 3 if the correction switching signal is "0", thereby outputting gamma correction data (R) as the gamma correcting portion (R) 1a.

Figure 3:
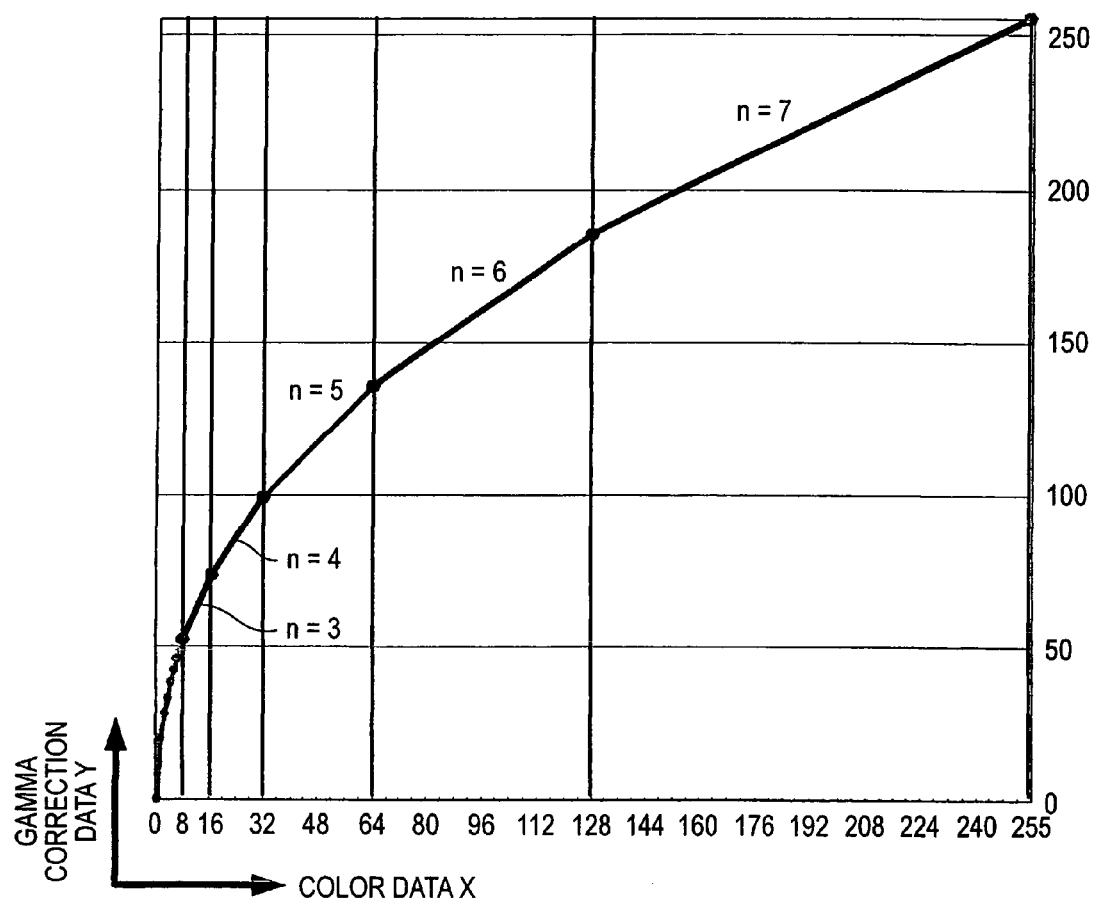
FIG. 3 is a chart showing the characteristic of the image processing apparatus according to the first embodiment of the invention.

FIG. 3 shows a gamma correction characteristic in the image processing apparatus according to the embodiment. As shown in FIG. 3, the gamma correction data Y have an ideal value stored in the look-up table 3 when the color data X are "0 to 7", and the gamma correction data Y are obtained by the polygonal line approximation when the color data X are "8 to 255".

As described above, there are provided the selector (the correction deciding portion 4 and the selector 5) for selecting the output of one of the approximating means (the approximating portion 2) and the first storage (the look-up table 3) corresponding to the input data. Consequently, the gamma correction data in a region in which an error is increased in the polygonal line approximation are partially prestored in the look-up table 3. Thus, all of the gamma correction data do not need to be stored in the table and a table having a large capacity is not required. As a result, the scale of a circuit can be reduced. Moreover, the output of the polygonal line approximating portion 2 is selected in the case in which the error of the gamma correction which is made by the polygonal line approximation is small, and the output of the look-up table 3 is selected in the case in which the error of the gamma correction which is made by the polygonal line approximation is large. Consequently, it is possible to obtain gamma correction data having a small error. Thus, it is possible to suppress a deterioration in picture quality.

By setting a sample point to be used in the polygonal line approximation to be a point set to have the power of two, moreover, it is possible to implement the polygonal line approximation by a shift processing and adding and subtracting processings. Thus, the divider and the division result table are not required so that the scale of the circuit can further be reduced.

By setting the gamma correction data corresponding to the input data which are to be stored in the look-up table 3 and the registers 6a to 6f for the polygonal line approximation (data on the sample point to be used for the polygonal line approximation) to have values reflecting the regulation of the picture quality, moreover, it is possible to implement the regulation of the picture quality such as a brightness or a contrast. For example, when a luminance value to be used in the brightness is represented as Br (a value to be used for the regulation of the brightness, 0 to 255 in case of 8 bits) and an inclination to be used in the contrast is represented as C (1 in a proportion, approximately 1 in the normal case), Equation 4 can be obtained.

$$Y = C \cdot X^{1/\gamma} + Br \quad \text{[Equation 4]}$$

As a result of the calculation, Y is rounded to be 0 in case of Y<0, and Y is rounded to be 255 in case of Y>255. While γ=2.2 has been taken as an example in the above description, this is not restricted.

Second Embodiment

Figure 4:
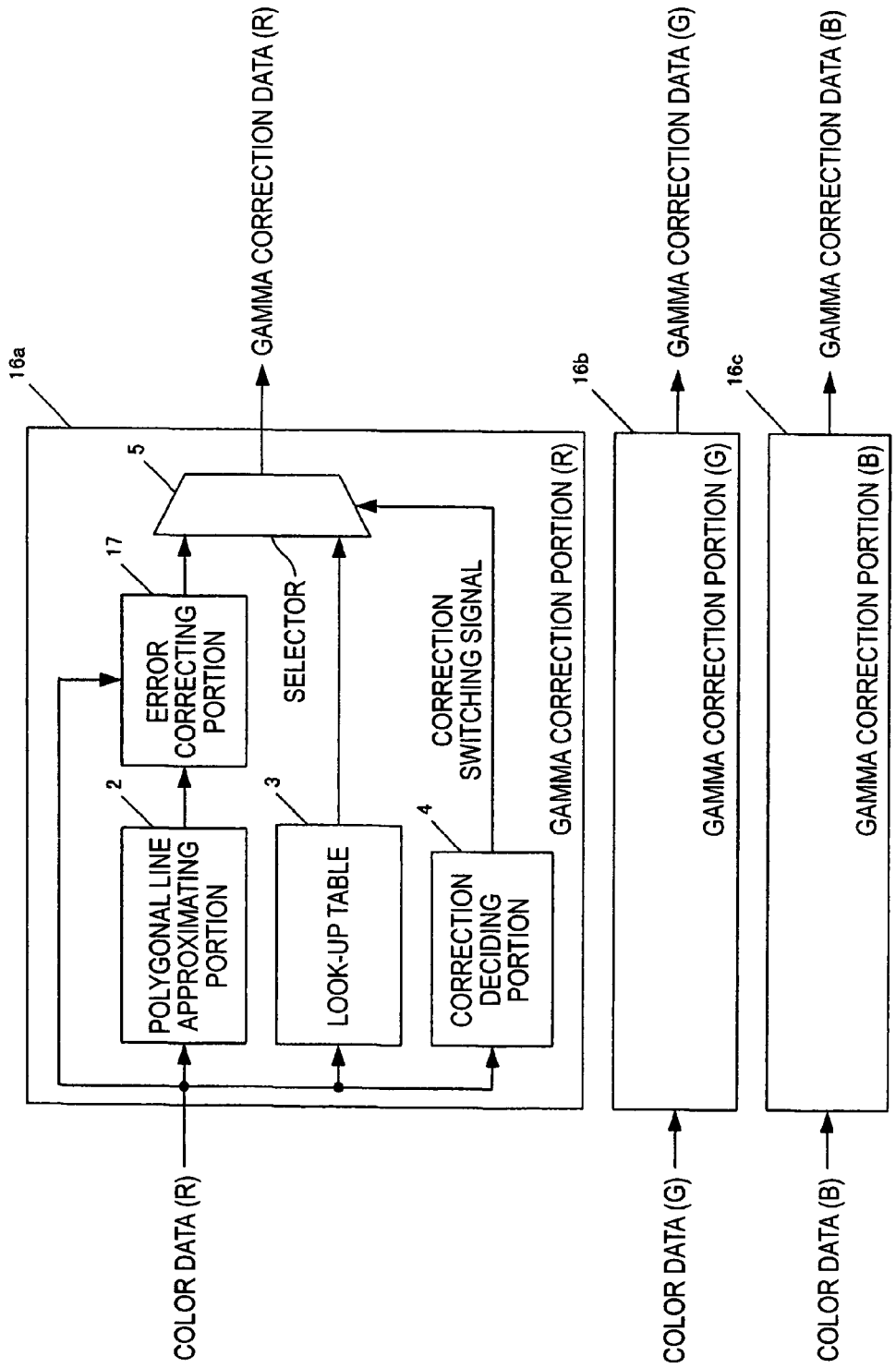
FIG. 4 is a block diagram showing the schematic structure of an image processing apparatus according to a second embodiment of the invention.

FIG. 4 is a block diagram showing the schematic structure of an image processing apparatus for explaining a second embodiment of the invention. In the drawing, common components to those in FIG. 1 have the same reference numerals as in FIG. 1 and detailed description thereof will be omitted.

A gamma correcting portion (R) 16a is different from the first embodiment in that an error correcting portion 17 for correcting the polygonal line approximation output of a polygonal line approximating portion 2 is provided between the polygonal line approximating portion 2 and a selector 5. The internal structures of a gamma correcting portion (G) 16b and a gamma correcting portion (B) 16c are the same as the internal structure of the gamma correcting portion (R) 1a.

Figure 5:
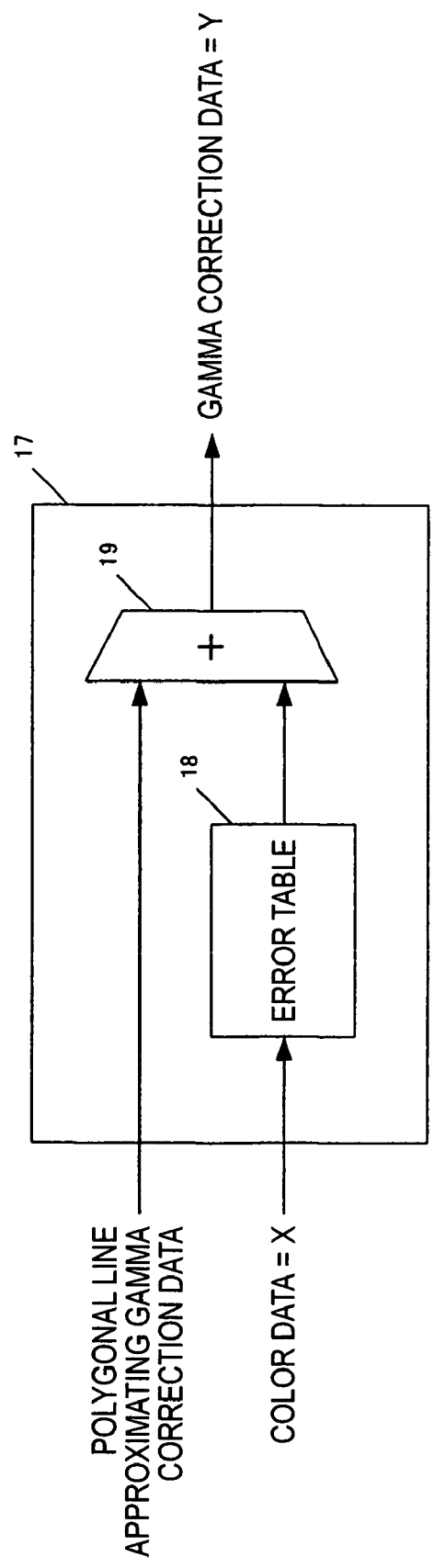
FIG. 5 is a diagram showing the schematic structure of an error correcting portion in the image processing apparatus according to the second embodiment of the invention.
Figure 6:
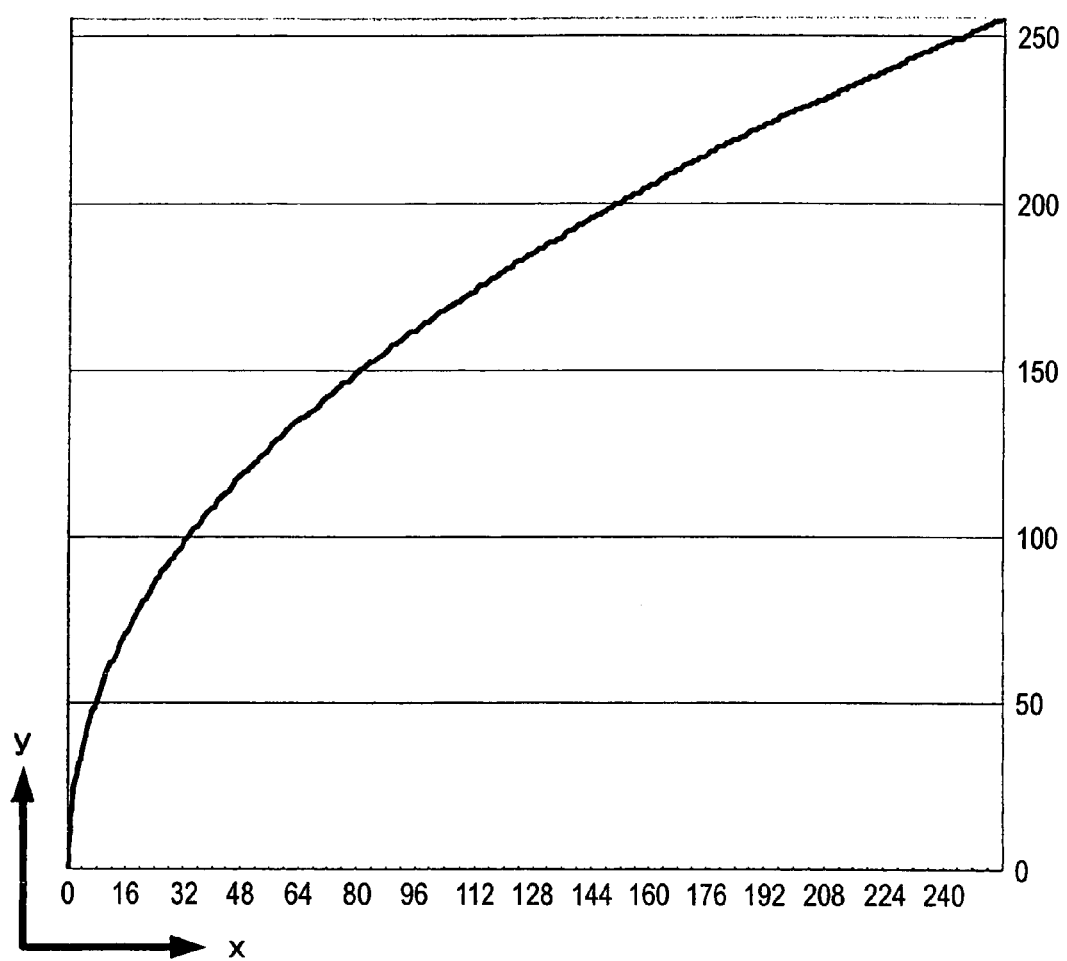
FIG. 6 is a chart showing a gamma correcting curve in case of γ=2.2.

FIG. 5 is a diagram showing a schematic structure for explaining the error correcting portion 17. In FIG. 5, an error table 18 serves to store an error between a polygonal line approximating output and a gamma correction ideal value, and to store an error between the ideal value of a gamma correction corresponding to color data X (8 to 255) and a polygonal line approximation. For example, the error between the gamma correction ideal value for the color data X and the polygonal line approximation is obtained as shown in Table 6 in case of x, gamma correction data of y, $y = \{(x/256)^{1/\gamma}\} \times 256$, and γ=2.2. The error is stored in the error table 18.

TABLE 6

| Color Data X | Gamma Correction Ideal Value | Polygonal Line Approximation | Error |
|---|---|---|---|
| 8 | 52 | 52 | 0 |
| 9 | 55 | 54 | 1 |
| 10 | 58 | 57 | 1 |
| ... | ... | ... | ... |
| 23 | 85 | 83 | 2 |
| 24 | 87 | 85 | 2 |
| 25 | 88 | 87 | 1 |
| ... | ... | ... | ... |
| 47 | 118 | 116 | 2 |
| 48 | 119 | 117 | 2 |
| 49 | 120 | 118 | 2 |
| ... | ... | ... | ... |
| 95 | 162 | 160 | 2 |
| 96 | 163 | 161 | 2 |
| 97 | 164 | 161 | 3 |
| ... | ... | ... | ... |
| 191 | 223 | 219 | 4 |
| 192 | 224 | 220 | 4 |
| 193 | 224 | 221 | 3 |
| ... | ... | ... | ... |
| 253 | 254 | 253 | 1 |
| 254 | 254 | 253 | 1 |
| 255 | 255 | 255 | 0 |

As shown in the Table 6, the error is "4" at a maximum and it is sufficient that the error data to be stored in the error table 18 are set to be 3 bits per data. If a portion having the error of "4" is changed into an error "3" and the error data are set to be 2 bits per data, furthermore, it is possible to reduce the circuit scale of the error table 18 still more. The error table 18 may be constituted by a memory such as an RAM or an ROM, or a register.

An adder 19 shown in FIG. 5 serves to add a polygonal line approximation output to an error stored in the error table 18, and to add the error data stored in the error table 18 to gamma correction data output from the polygonal line approximating portion 2 shown in FIG. 4. A value output from the adder 19 is gamma correction data Y output from the error correcting portion 17.

As described above, according to the image processing apparatus in accordance with the embodiment, the difference between the data generated by the polygonal line approximation and the ideal value is stored in the error table 18 and the polygonal line approximation is further corrected based on the same data. Consequently, a more ideal gamma correction can be carried out on a smaller circuit scale with higher precision than that in the first embodiment.

In the same manner as in the first embodiment, moreover, it is possible to implement the regulation of picture quality such as a brightness or a contrast by setting a value reflected by the regulation of the picture quality to the look-up table 3, the registers 6a to 6f for the polygonal line approximation and the error table 18. While γ=2.2 has been taken as an example in the above description, this is not restricted.

The invention produces an advantage that there are provided the selector selecting the output of one of the approximating means and the first storage corresponding to the input data, and thus, the gamma correction data in a region in which an error is increased in the polygonal line approximation are partially prestored in the first storage so that all of the gamma correction data do not need to be stored in the first storage and a storage having a large capacity is not required, resulting in a reduction in the scale of a circuit, and furthermore, the output of the approximating means is selected in the case in which the error of the gamma correction which is made by the polygonal line approximation is small, and the output of the first storage is selected in the case in which the error of the gamma correction which is made by the polygonal line approximation is large, and consequently, it is possible to obtain gamma correction data having a small error, thereby suppressing a deterioration in picture quality, and is useful for an image processing apparatus and an image processing method which carry out a gamma correction for input data of a display for a television or a car navigation system, for example.

What is claimed is:

1. An image processing apparatus comprising:

approximating means for carrying out a gamma correction by a polygonal line approximation;

a first storage which partially stores gamma correction data corresponding to input data; and a selector which selects an output of one of the approximating means and the first storage corresponding to the input data, a corrector correcting a polygonal line approximation output of the approximating means, a second storage which stores an error between the polygonal line approximation output and a gamma correction ideal value; and an adder which adds the polygonal line approximation output and the error to be stored in the second storage.

2. An image processing method comprising a selecting step of selecting one of gamma correction data obtained by a polygonal line approximation according to the input data and gamma correction data corresponding to the input data based on an error between the gamma correction data, and a correcting step of correcting the gamma correction data obtained by the polygonal line approximation, wherein the correcting step adds the gamma correction data obtained by the polygonal line approximation to an error between the gamma correction data obtained by the polygonal line approximation and a gamma correction ideal value.

3. An image processing method comprising a selecting step of selecting one of gamma correction data obtained by a polygonal line approximation according to the input data and gamma correction data corresponding to the input data based on an error between the gamma correction data, wherein the gamma correction data corresponding to the input data and the data on the sample point to be used in the polygonal line approximation have a value Y obtained by an equation of $Y=C \cdot X^{1/\gamma}+Br$, where X represents the input data, Y represents data obtained after the regulation of the picture quality, Br represents a luminance value to be used in a brightness, and C represents an inclination to be used in a contrast.

* * * * *